3,057,897
PREPARATION OF ORGANOLEAD COMPOUNDS
Gene C. Robinson, Baton Rouge, La., assignor to Ethyl Corporation, New York, N.Y., a corporation of Delaware
No Drawing. Filed Jan. 5, 1959, Ser. No. 784,860
5 Claims. (Cl. 260—437)

This invention pertains to the preparation of the organolead compounds.

Various methods for preparing organolead compounds have been disclosed in the literature including the reaction of lead salts with certain organometallic compounds and the reaction of a sodium-lead alloy with alkyl halides. Despite the numerous references in the literature to processes for the preparation of organolead compounds, tetraethyllead is the only organolead compound produced commercially today. This material is produced by the aforementioned well-known process of reacting a sodium-lead alloy with ethyl chloride. The procedure has been practiced for over 30 years and, in general, is satisfactory and quite economical. However, an inherent disadvantage of the process, which has long been recognized, is that 75 percent of the lead employed as alloy results as by-product lead which must be reprocessed in order to effect the economies of the procedure.

Recognizing this deficiency of the commercial process, many attempts have been made to further utilize the by-product lead produced. For example, in U.S. Patent 2,535,193 there is described a process whereby such by-product lead is further reacted with a Grignard compound, RMgX, and additional organic halide to produce the organolead product and the magnesium halide. A somewhat analogous process employing the organic compounds of lithium, zinc and cadmium, is disclosed in U.S. Patents 2,558,207, 2,562,856 and 2,591,509 respectively. These processes have shown that the by-product lead can be further reacted to produce additional organolead compound. However, it is to be noted that they have not been employed to any appreciable extent and are not employed in connection with the present commercial process. The principal reasons therefor are the excessive costs of the particular organometallic compound employed, the complete consumption of such compound, the low yields obtained, and requirement of particular solvents to effect the reaction. Since such processes do not result in an economical operation such to revise the present commercial process, they have not been employed. Therefore it is still desirable to obtain a process in which lead metal can be more efficiently and economically alkylated including the by-product lead metal of the present commercial process for obtaining tetraethyllead.

Accordingly, an object of this invention is to provide a new, novel, and efficient process for the preparation of organolead compound. Another object is to provide a process for the preparation of organolead compounds in high purity and yield. A still further object is to provide a process for the production of organolead compounds employing more economical and efficient materials. A particular object is to provide a process for the more efficient production of the commercial product, tetraethyllead, whereby a quantiative conversion of the lead metal used in the reaction results in the product desired. These and other objects will be evident as the discussion proceeds.

It has now been found that organolead compounds can be prepared by reacting lead metal with a hydride of a metal selected from the group consisting of group I–A and II–A metals, an organic ester of an inorganic acid, and an olefin in the presence of a metal-containing compound capable of forming a complex with said metal hydride. By this procedure a quantitative conversion of the lead metal to organolead product can be obtained. The group I–A alkali metal hydrides are preferred metal hydrides, the alkyl halides are preferred esters, the α-olefins are preferred olefins, and a fully alkylated group III–A element organometallic compound, especially those of aluminum, are preferred compounds of metals capable of forming a complex with said metal hydride. Although the temperature at which the reaction is conducted is subject to considerable latitude, it is preferred to operate at between about 25 to 150° C. In a particularly preferred embodiment of the present invention lead is reacted simultaneously with sodium hydride, ethyl chloride, and ethylene in the presence of a catalytic amount of triethylaluminum at between about 25 to 150° C.

The process results in the efficient reaction of lead metal to produce organolead compounds. Generally an essentially quantitative conversion of the lead metal to organolead compound is obtained. Another advantage is that a sodium lead alloy need not be prepared nor must any by-product lead be reprocessed as required in the present commercial process for the manufacture of tetraethyllead. A particular advantage is that the compound of the metal capable of complexing with the metal hydride is used as a catalyst and is readily recoverable and reused. In other words, this material remains essentially static in the reaction system and can be employed in minor amounts so that it is not required to be reproduced or reformed and is readily separable at the completion of the reaction for reuse. In further demonstrating the advantages, this particular feature also permits a more efficient continuous process for the production of organolead compounds in simplifying the recovery procedures since the organolead product can be continuously distilled from the reaction system leaving the by-products including the catalytic material in the reactor for further reaction with feed lead, metal hydride, olefin and alkylating agent. Still further advantages of the process of this invention will be evident as the discussion proceeds.

As briefly mentioned above the metal hydrides employed in the process are those of metals of group I–A and II–A of the periodic chart of the elements. Included among such hydrides are the hydrides of lithium, sodium, potassium, rubidium, cesium, beryllium, magnesium, calcium, strontium, and barium. The group I–A metal hydrides, especially sodium hydride, are particularly preferred because of their greater availability, ease of formation, economy and greater reactivity. Such materials are prepared by known techniques and are preferably employed in solution or as finely divided particles when such are solid under the reaction conditions. For example, sodium hydride is generally subdivided to be of particle size below about 1/8″ in major dimension and more preferably below about 500 microns. Such particle sizes are readily attainable by chemical means of formation of the metal hydride, for example, reacting a sodium dispersion with hydrogen or by mechanical subdivision. It is convenient to base the amount of the metal hydride upon the lead metal employed, generally between about 0.5 to 10 stoichiometric equivalents of metal hydride per mole of lead are employed. In order to achieve the most efficient utilization of the metal hydride it is preferred to employ between about 1 to 4 stoichiometric equivalents per mole of lead. It is to be understood that the metal hydride can be prepared in situ, e.g. feeding the metal, preferably in finely divided form and pressurizing with hydrogen.

The reaction is conducted in the presence of a metal-containing compound capable of forming a complex with said metal hydride. Although the mechanism is not fully understood and there is no intent to be bound by any particular mechanism, it appears that this material complexes with the metal hydride placing it in a form of rapid alkylation by the olefin for subsequent reaction with the lead metal and then the material is released and complexes with another molecule of the metal hydride. In this sense then it is a catalyst or complex material which effects the reaction of the lead metal with the olefin contained in the mixture. It is particularly preferred that this material be a compound of a metal of the group II–B and III–A metals. Such materials can be depicted by the following formula $$MA_x$$

wherein M is selected from the group consisting of II–B and III–A elements, each A is a radical selected from the group consisting of hydrocarbon radicals having up to 18 carbon atoms, halogens, alcohol residues having up to 18 carbon atoms, and hydrogen, and $x$ is the valence of M. In a particularly preferred embodiment, M is aluminum or boron and each A is an alkyl radical, preferably the same, having up to and including about 8 carbon atoms. Typical examples of such complexing materials include diethylzinc, dihexylzinc, dioctylzinc, dioctyldecyl zinc, dicyclohexylzinc, diethenylzinc, diphenylzinc, dibenzylzinc, dinaphthylzinc, ethylzinc chloride, ethylzinc iodide, ethylzinc ethoxide, zinc chloride and the like; triethylaluminum trioctylaluminum, trioctadecylaluminum, triethenylaluminum, trihexynylaluminum, tricyclopentylaluminum, triphenylaluminum, tribenzylaluminum, diethylaluminum hydride, diethylaluminum ethoxide, diethylaluminum chloride, ethylaluminum dichloride, aluminum hydride, ethylaluminum dimethoxide, and the like and similar such compounds wherein cadmium and mercury are substituted for zinc and boron, gallium, indium, or thallium are substituted for aluminum. In a particularly preferred embodiment the fully alkylated aluminum and boron compounds especially aluminum are preferred wherein the alkyl groups contain up to about 8 carbon atoms since such materials exhibit greater complexing ability with the metal hydride and are more readily recoverable for reuse from the reaction mixture. This complexing material can be employed in varying amounts as for example as little as about 0.001 to 100 parts by weight thereof per part by weight of the metal hydride. In an especially preferred embodiment such material is employed in amounts between about 0.01 to 0.5 stoichiometric equivalent per mole of the lead.

In general the olefin employed in the process of this invention is not critical and can be any olefinic compound having at least 1 double bond between carbon atoms. Such can be in gaseous form, a liquid, or a solid which is soluble in the reaction system. Included among such materials are for example ethylene, propylene, octene-1, octene-2, octene-4, decene-1, decene-3, decene-2, octadecene-1, octadecene-4, butadiene, hexadiene, octadiene, cyclopentene, cyclohexene, cyclopentadiene, styrene, benzene, and the like. In general, such materials will contain up to about 18 carbon atoms. The liquid and gaseous olefins are particularly preferred and additionally those olefinic materials wherein the double bond is in the terminal or $\alpha$-position are especially preferred because of their greater reactivity. Particularly preferred olefins are the terminal olefins having up to about 8 carbon atoms in a hydrocarbon straight chain. The olefin is employed generally on an equimolar basis or higher, to the moles of metal hydride employed. In a preferred embodiment for economy and ease of operation between about 1 to 4 stoichiometric equivalents of olefin per mole of lead are utilized.

The organic esters of inorganic acids are compounds which are capable of contributing an organic radical wherein a carbon atom will bond to the lead metal. In this sense they can also be termed hydrocarbylating agents. It is to be understood that this terminology embodies not only the formation of alkyllead compounds, but also aryl, cycloalkyl, and the like, and in general, both aliphatic and aromatic lead compounds. Such materials can be depicted by the formula

wherein at least one of said R's is an organic radical, preferably hydrocarbon alkyl, and the other can be the aforementioned organic radicals or hydrogen, Z is an anion which is bonded with the aforementioned R groups, and "$a$" is a small whole number from 0 to 2 inclusive. The preferred Z groups comprise the sulfate, phosphate and halogen anions derived from the corresponding inorganic acids. Included among such materials are for example ethyl chloride; ethyl bromide; ethyl iodide, butyl chloride, bromide and iodide; octyl chloride, bromide and iodide; decyl chloride, bromide and iodide; octadecyl chloride, bromide and iodide; vinyl chloride; cyclohexyl chloride; phenyl chloride, ethynyl chloride; benzyl chloride; naphthyl chloride; and the like and similar such compounds wherein the anion is the phosphate or sulfate anion as for example diethyl sulfate, ethyl ethane sulfonate, sodium ethyl sulfate, ethyl p-toluene sulfonate, dioctyl sulfate, triethyl phosphate, trioctadecyl phosphate and the like. The alkylating and arylating agents are preferred esters or hydrocarbylating agents. The alkylating agents which are organic halides, particularly the hydrocarbon halides having up to about 18 carbon atoms, are especially preferred because of their greater availability and reactivity. In an especially preferred embodiment the alkyl chlorides having up to and including 8 carbon atoms are generally employed because of the higher yields obtained and their more practical application. The organic ester is employed between about 0.5 to 20 stoichiometric equivalents, preferably 6 to 10, per mole of lead employed.

The lead metal which is employed can be in any form but is preferably in the finely divided state. Generally particle sizes below about ⅛" major dimension are preferred. Such metal can be obtained either by mechanical or chemical methods. Mechanical methods involving grinding or shaving lead metal are applicable and chemical methods wherein lead metal is precipitated or deposited in finely divided form are also applicable.

Further examples of lead which can be successfully employed include lead powders resulting from the decomposition of organolead compounds by heat, such as for instance, the lead deposited during the thermal decomposition of organolead compounds. Certain other forms of lead powders which are applicable for use in making organolead can be prepared by grinding or otherwise comminuting lead metal or massive lead, especially when this is done in an atmosphere of nitrogen or under an appropriate liquid, which prevents the contamination of the lead surface. A further example of a method of preparing a finely divided lead suitable for practicing the invention is the reductive precipitation of lead from its compounds. Other methods such as electrolytic deposition will occur to those skilled in the art.

Lead alloys, particularly alloys containing alkaline earth and alkali metals, are also a good source of lead. Sodium-lead alloy is an especially good alloy for such use. Other examples of metals alloyed with the lead which can be successfully used in practicing the invention are calcium, potassium and magnesium. In general any alloy which will react in the following equation can be employed as a source of lead:

Metal-lead alloy + ethyl chloride
= tetraethyllead + lead + metal chloride

The process of this invention will be more completely understood from a consideration of the following examples. In each instance, all parts are by weight.

Example I

To an autoclave equipped with external heating means, internal agitation, and a means for venting gases is added 20 parts of finely divided lead of particle size less than 1/16", 10 parts of sodium hydride of particle size below 500 microns and 1 part of aluminum triethyl. Agitation is commenced and the mixture heated to 70° C. Then 45 parts of ethylene and 27 parts of ethyl chloride are pressurized into the system to 500 p.s.i. over a period of 30 minutes. These conditions are maintained for an additional 1 hour and then the reaction mixture is cooled to room temperature and the gases vented to the atmosphere. About 10 parts of isopropyl alcohol are added to kill the aluminum triethyl and then the mixture is washed with water. The supernatant organic layer is decanted and dried. In this manner a high yield of tetraethyllead is obtained.

Example II

Employing the apparatus of Example I, 61.5 parts of sodium-lead alloy (NaPb) and 1.7 theories of ethyl chloride are added thereto over a period of 45 minutes. The reaction mixture is permitted to cook at reaction temperature for 30 minutes and then 2 parts of aluminum triethyl and 15 parts of sodium hydride are added to the reactor while simultaneously pressurizing with 25 parts of ethylene and 40 parts of ethyl chloride over a period of 30 minutes. The reaction mixture temperature is maintained at 80° C. At the end of the feed period the mixture is cooked for an additional ½ hour. Tetraethyllead is recovered from the reaction mixture by distillation at 82° C. and 13 millimeters of mercury in high yield and purity.

Example III

Employing the procedure of Example I, 10 parts of lead are reacted with 1 part of lithium hydride, 20 parts of ethylene and 7 parts of ethyl chloride in the presence of 0.14 part of aluminum triethyl for 2 hours at 110° C. Tetraethyllead is recovered in high yield.

Example IV

Example III is repeated with exception that magnesium hydride is substituted for lithium hydride. Tetraethyllead is recovered according to the procedure of Example I in high yield.

Example V

Example I is repeated with exception that 2 parts of diethylzinc are substituted for triethylaluminum and the reaction is conducted at 30° C. for 4 hours with ethylene and ethyl chloride pressure at 350 p.s.i.

Example VI

Tetraethyllead is produced in high yield when Example I is repeated substituting 45 parts of ethylbromide for the ethyl chloride and 1.5 parts of triethylboron for triethylaluminum with the reaction being conducted at 40° C. and 400 p.s.i. for 1½ hours.

Example VII

In this run 10 parts of lead are reacted with 10 parts of potassium hydride, ethylene and ethyl chloride in the presence of a minor amount of triisopropylaluminum for 3 hours at 100° C. and 75 p.s.i. to produce tetraethyllead in high yield based upon the lead metal employed.

Example VIII

Example I is repeated with exception that 60 parts of diethyl sulfate are substituted for the ethyl chloride. Tetraethyllead is produced in high yield.

Example IX

When triethylphosphate is substituted for ethyl chloride in Example I an equally high conversion of the lead metal to tetraethyllead is obtained.

Example X

Example V is repeated with the exception that 0.56 part of aluminum trichloride in 30 parts of the dimethyl ether of diethylene glycol are substituted for the diethylzinc with the reaction temperature at 125° C. for 2 hours. Tetraethyllead is obtained in high yield.

Example XI

Repeating Example X but substituting 0.06 part of aluminum triethoxide for the aluminum trichloride, tetraethyllead is obtained in high yield.

Example XII

When 5 parts of finely divided sodium hydride, and 20 parts of finely divided lead are reacted with ethylene and ethyl chloride at 50° C. and 50 p.s.i. in the presence of 1 part of diethylaluminum hydride for 1½ hours, tetraethyllead is obtained in high yield.

Example XIII

Substituting diethylaluminum chloride for diethylaluminum hydride in the above example, tetraethyllead is again obtained in high yield.

Example XIV

When 10 parts of finely divided lead are reacted with 5 parts of finely divided sodium hydride, cyclohexene and cyclohexenyl bromide at 100° C. and atmospheric pressure in the presence of tricyclohexylaluminum, tetracyclohexyl lead is obtained.

Example XV

Calcium hydride, 10 parts, of particle size less than 100 microns is simultaneously reacted with finely divided lead, ethylene and ethyl chloride in the presence of triethylaluminum with the ethylene and ethyl chloride being pressurized at 50 p.s.i. at 60° C. for 4 hours. Tetraethyllead is obtained.

Example XVI

Tetraoctyllead is produced when 10 parts of potassium hydride, 20 parts of finely divided lead, 3 parts of trioctylaluminum, 70 parts of octyl bromide, and octene-1 in slight excess are added to the reactor employed in Example I and then the reaction mixture is heated to 45° C. and maintained at this temperature for 3 hours.

Example XVII

Example I is repeated with the exception that isobutene is substituted for ethylene, isobutylchloride is substituted for ethyl chloride and triisobutylaluminum is substituted for triethylaluminum with the reaction temperature at 25° C. for 6 hours. Tetraisobutyllead is recovered by fractional distillation of the reaction mixture. Then the residue is filtered and to the filtrate is added sodium hydride and finely divided lead. The reactor is then pressurized to 50 p.s.i. with isobutene and isobutyl chloride and permitted to react for an additional 6 hours whereby additional tetraisobutyl lead is produced. The residue from the first filtration operation is washed with water to dissolve the sodium chloride from any unreacted lead and such lead is reused. The procedure of this example is continuously duplicated.

It is not necessary that the olefin employed contain the same number of carbon atoms and configuration as does the organic radicals of the ester. The following example will demonstrate this embodiment of the invention.

Example XVIII

Employing the procedure of Example I, to the reactor are added 10 parts of finely divided sodium hydride, 20 parts of finely divided by-product lead, obtained from the reaction of sodium-lead alloy with ethyl chloride, and 3 parts of aluminum triethyl dissolved in toluene. The so-formed reaction mixture is then heated to 90° C.

and 50 parts of phenyl chloride and 45 parts of ethylene are then gradually added to the reactor maintaining the pressure at 75 p.s.i. These conditions are maintained for 6 hours. At the end of this period mixtures of ethyl phenyllead compounds are obtained. Such compounds are recovered by adding isopropyl alcohol to the reaction mixture and then fractionally distilling the lead compounds from the reaction mixture.

The above examples are presented by way of illustration and it is not intended to be limited thereby. It will be evident that the various metal hydrides, olefins, esters, and complexing compounds described hereinbefore can be substituted in the above examples to produce similar results.

In general the reaction conducted according to the process of this invention is self-sustaining and can be initiated at temperatures as low as about −20° C. and as high as about 200° C. and higher depending upon the decomposition temperature of the products. It is preferable to employ a temperature between about 25 to 150° C. to avoid side reaction and excessive decomposition of the products. If desired, thermal stabilizers which are well-known to the art can be employed when higher temperatures are used, as for example naphthalene, anthracene and the like. Although the process will proceed at subatmospheric, atmospheric and superatmospheric pressure, it is generally desirable to maintain some pressure in the system. Autogenous pressure is usually employed. Pressures as high as about 2000 pounds per square inch and higher can be employed although generally a pressure between 20 p.s.i. to 600 p.s.i. is employed.

The reaction time can likewise be varied over a considerable range. Generally not more than about 20 hours reaction time is required and less than 6 hours is desirable to avoid excessive exposure of the product at the higher temperatures which may result in some decomposition. In a particularly preferred embodiment between about ½ to 4 hours reaction time is used.

In general diluents or solvents are not required in the process but can be used to advantage for heat distribution and solvating in certain instances when the reactants are solid. The organic solvents which are essentially inert under the reaction conditions and liquid are applicable. For such purpose the hydrocarbons, ethers, and amines, especially tertiary amines, have been found most suitable. Among the hydrocarbons are included both aliphatic and aromatic materials as for example the hexanes, octanes, nonanes, cyclohexanes, benzene, toluene, xylene, tetralin and the like. The ethers include for example diethyl ether, diamyl ether, dioctyl ether, methylamyl ether, diphenyl ether, dibenzyl ether, cyclic ethers, such as dioxane, tetrahydrofuran and the polyethers as for example the dimethyl, diethyl, dibutyl and the like ethers of ethylene glycol, diethylene glycol, triethylene glycol, and tetraethylene glycol. Included among the amines are the primary, secondary and tertiary amines, especially the tertiary amines, which are less reactive with the bimetallic organometallic compound. Typical examples of such amines include ethyl, butyl and octyl amine, diethyl amine, dibutyl amine, dicyclohexyl amine, diphenyl amine, dibenzyl amine, triethyl amine, triphenyl amine, aniline, pyridine and isoquinoline. While many of the ethers and amines will complex with certain reactants, this does not hinder their use in the reaction. The aromatic hydrocarbons, cyclic ethers, polyethers and tertiary amines comprise a preferred group of diluents to be employed because of their greater availability and easier recovery from the reaction system. The cyclic ethers and polyethers especially tetrahydrofuran and the dimethyl diethyl and methyl ethyl ethers of diethylene glycol are particularly preferred because of their greater solubility for the reactants and their reaction promoting effect.

When a diluent is employed, it is generally present in amount sufficient to enhance the fluidity of the reaction mixture. This will be dependent somewhat upon the solubility of the reactants in the diluent and the particle size of the solids which are present. In general between about 1 part to 100 parts of diluent per part by weight of the lead are employed.

The products produced according to this invention are of considerable and well-known utility. The most important use is as an additive to internal combustion engine fuels in order to enhance their antiknock properties and to increase the octane number. For example, as little as 1 gram of lead in the form of tetraethyllead added to 1 gallon of a motor fuel of the gasoline boiling range will enhance its octane number and its antiknock properties. Another particular use of the compounds of this invention is in the formation of catalysts for the polymerization of olefins. For example, a catalyst for the polymerization of ethylene can be prepared by decomposing tetraethyllead in the presence of triethylaluminum. A still further use for the compounds of this invention is their reaction with mercury salts to produce agricultural chemicals. For example, tetraethyllead can be reacted with mercurous acetate to produce ethyl mercury acetate which is useful as a disinfectant. These and other uses of the products will be evident.

Having thus described the process of this invention it is not intended that it be limited except as set forth in the following claims:

I claim:

1. A process for the preparation of a hydrocarbon lead compound which comprises reacting lead metal with a hydride of a metal selected from the group consisting of I–A and II–A metals, an organic ester selected from the group consisting of a hydrocarbon sulfate, hydrocarbon phosphate, and a hydrocarbon halide wherein said hydrocarbon groups have up to 18 carbon atoms, and a hydrocarbon olefin having up to 18 carbon atoms and up to two double bonds, in the presence of a metal containing compound having the formula $$MA_x$$

wherein M is selected from the group consisting of group II–B and III–A elements, and A is a radical selected from the group consisting of hydrocarbon radicals having up to 18 carbon atoms, alkoxide radicals having up to 18 carbon atoms, halogens, and hydrogen, and $x$ is a small whole number equal to the valence of M.

2. The process of claim 1 wherein said lead metal is finely divided, said metal hydride is a group I–A metal hydride, said organic ester is a hydrocarbon halide, said olefin is an alpha olefin having up to 8 carbon atoms, and said metal-containing compound is a trialkylaluminum compound.

3. The process of claim 2 wherein the reaction is conducted at a temperature between about 25 to 150° C.

4. The process for the production of tetraethyllead which comprises reacting sodium hydride with ethyl chloride, lead and ethylene in the presence of triethylaluminum at a temperature between about 25 to 150° C.

5. The process of claim 4 wherein said triethylaluminum is employed in catalytic quantities.

References Cited in the file of this patent
UNITED STATES PATENTS
2,850,513    Pines _____ Sept. 2, 1958